June 10, 1924.

A. P. LEE 1,496,991

BOTTOM DUMP VEHICLE

Filed Sept. 7, 1920

Witnesses:
W. F. Kilroy
Harry R. White

Inventor:
Albert P. Lee

By Jabel & Mueller
Attys.

June 10, 1924.

A. P. LEE 1,496,991

BOTTOM DUMP VEHICLE

Filed Sept. 7, 1920

Witnesses:
W. F. Kilroy
Harry R. White

Inventor:
Albert P. Lee
By Gabel & Mueller
Attys

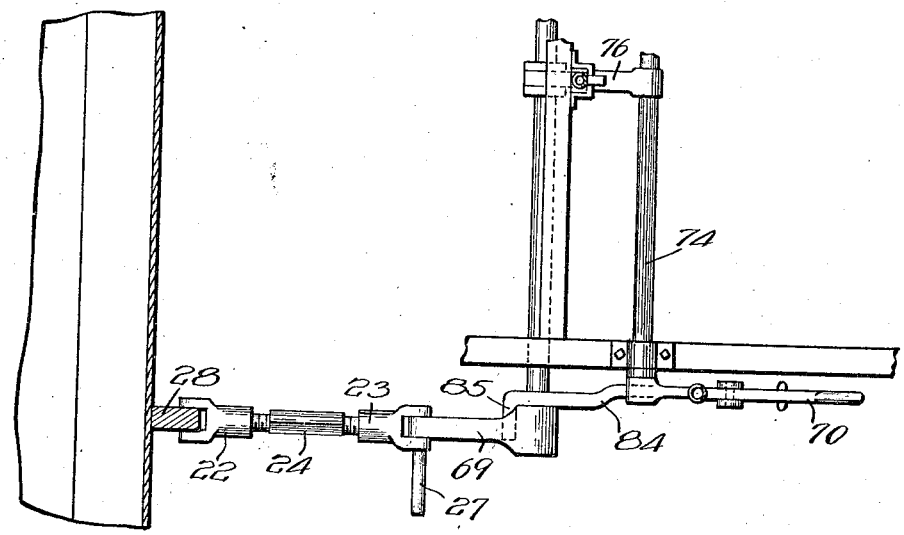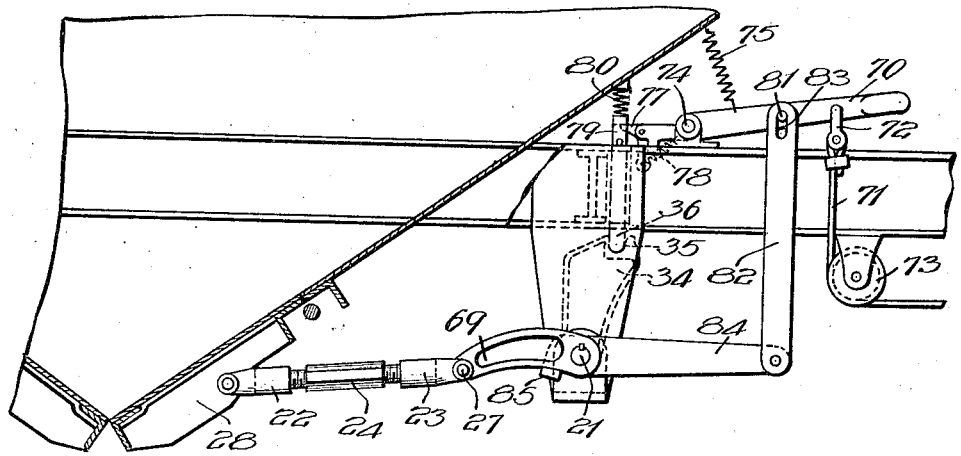

Patented June 10, 1924.

1,496,991

UNITED STATES PATENT OFFICE.

ALBERT P. LEE, OF CHICAGO, ILLINOIS, ASSIGNOR TO LEE TRAILER & BODY COMPANY, OF CHICAGO, ILLINOIS.

BOTTOM-DUMP VEHICLE.

Application filed September 7, 1920. Serial No. 408,458.

*To all whom it may concern:*

Be it known that I, ALBERT P. LEE, a citizen of the United States, residing at Chicago, in the county of Cook and State of Illinois, have invented a certain new and useful Improvement in Bottom-Dump Vehicles, of which the following is a full, clear, concise, and exact description, reference being had to the accompanying drawings, forming a part of this specification.

This invention relates to bottom dump vehicles, and more particularly to vehicles having a hopper mounted thereon provided with doors in the bottom thereof to permit discharge of the contents of the hopper from the bottom thereof.

It is an object of the invention to provide a vehicle of this character wherein the swinging doors are adapted to be opened to any desired extent and checked in the opening movement at any desired point so as to provide a spreader means if desired, or to dump the contents of the hopper in a pile should this be preferred. The swinging doors are preferably so mounted that the vehicle may be moved over the pile, without any interference from the doors. This is accomplished by mounting the doors so that they may swing to a substantially horizontal position when they come in contact with the material discharged.

It is another purpose of the invention to provide a new and improved actuating mechanism for the doors at the bottom of the hopper and new and improved locking means for said doors and for said actuating mechanism. It is a further purpose of the invention to provide adjustable actuating and locking means and to provide means whereby the locking means may be operated to lock or release the same from the driver's seat or some other remote point.

It is a further object of the invention to provide a vehicle with a bottom dump hopper that is made in sections so that the vehicle can be converted into a vehicle with a flat bed, so as to be capable of carrying lumber or other similar objects, or to be provided with a body with a flat bottom. This purpose is accomplished by making the bottom portion of the hopper a permanent part of the vehicle with its upper edge portions flush with the upper surface of the vehicle framework, and providing a detachable upper section having means thereon adapted to rest on and be detachably secured to said framework.

Other objects and advantages of the invention will appear as the description of the accompanying drawings proceeds, it being understood that it is not intended to limit the invention to the exact details of structure shown or described, but to include therein all such changes and modifications of the structure shown and described as would suggest themselves to a person skilled in the art to which the invention appertains and falling within the scope of the claims.

In the drawings:—

Fig. 1 is a side elevation of a bottom dump vehicle made in accordance with my invention;

Fig. 5 is a plan view of a slightly modified form of the operating and locking mechanism, showing means whereby the doors can be unlocked and opened from the driver's seat or any other convenient point, Fig. 6 is a side elevation of the structure shown in Fig. 5; and Fig. 7 is a detail sectional view on line 7—7 of Fig. 1.

Figure 2:
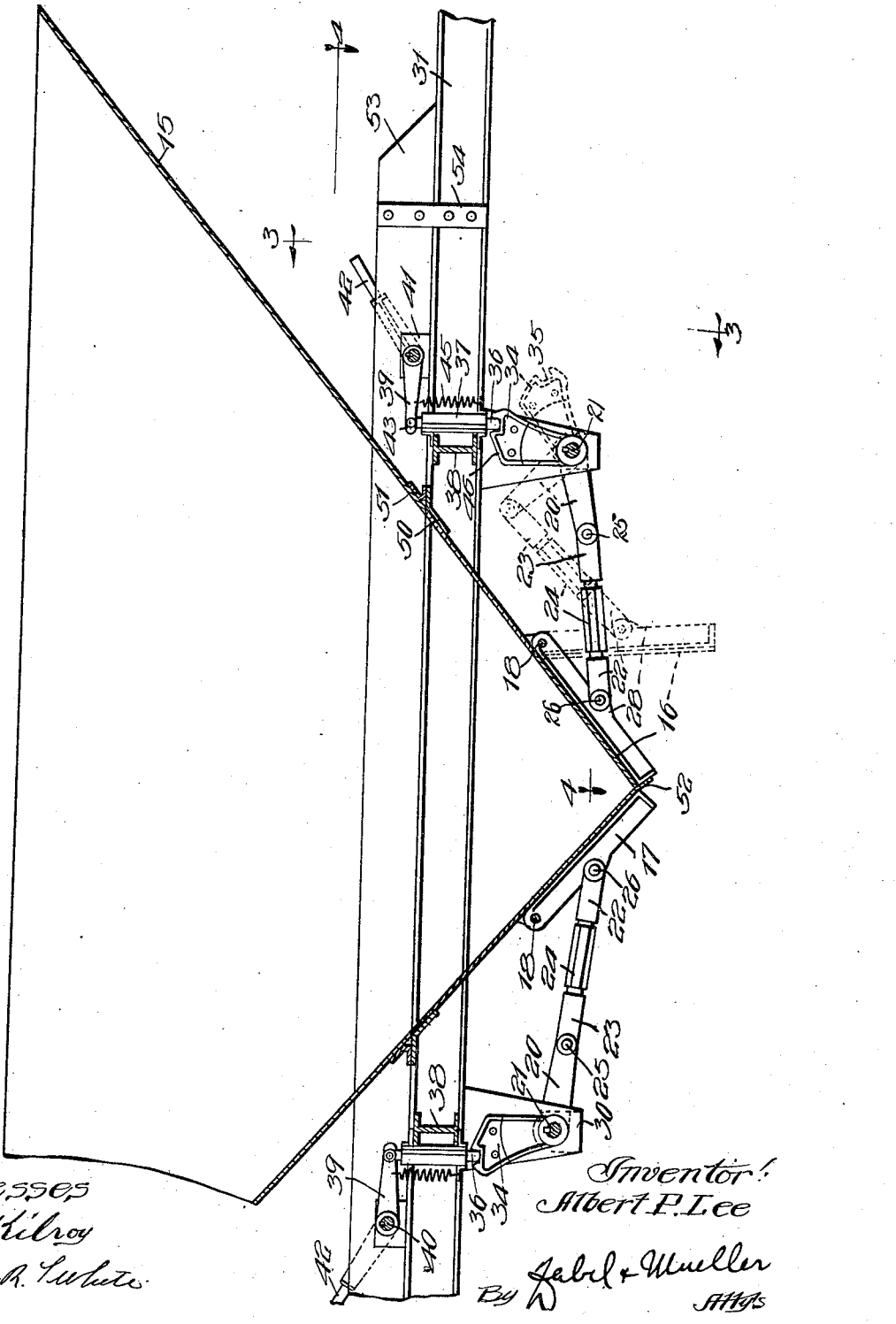
Fig. 2 is an enlarged view partly in longitudinal section and partly in side elevation of the improved bottom dump hopper and associated parts showing the actuating and locking mechanism for the swinging doors.
Figure 3:
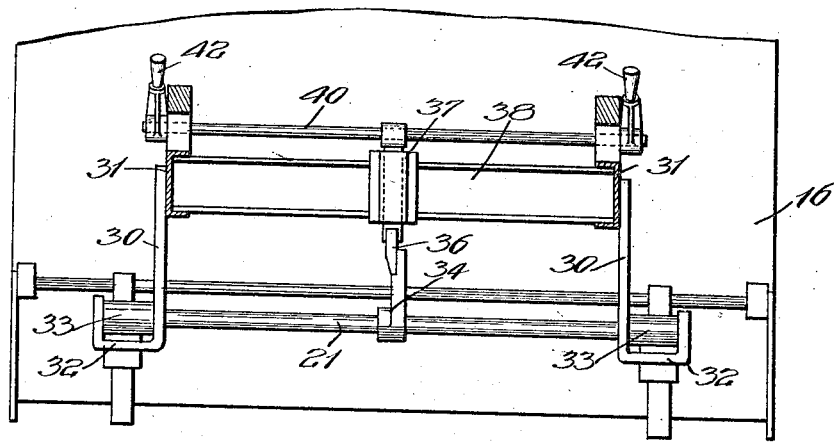
Fig. 3 is a section taken on the line 3—3 of Fig. 2, looking in the direction of the arrows and showing the operating and locking mechanism in end elevation.

Referring in detail to the drawings the invention comprises a vehicle having a framework 10 provided with the wheels 11 and springs 12 suitably mounted on the framework. The framework 10 is provided with a hopper having a lower portion 14 which is a permanent part of the framework and an upper portion 15 which is detachably mounted thereon. The hopper formed by the portions 14 and 15 is of the bottom dump variety being provided with suitable doors 16 and 17 providing an opening for the bottom of the hopper. The doors 16 and 17 are hinged on transverse pivots 18 and are provided with suitable means for holding them in closed position and for opening the same, which means are in the form of a toggle mechanism comprising an adjustable link and a link 20 which is keyed to a transverse shaft 21. The adjustable link is provided with a portion 22 suitably pivoted to the door 16 or 17 and a portion 23 is pivoted to the link 20, the portions 22 and 23 being internally screw threaded in opposite directions and being adapted to receive the opposite external screw threads of the member 24 which is provided with flat faces on the body portion thereof to facilitate turning of the same for purposes of adjustment. The pivot 25 between the link portions 23 and the link 20 is so arranged that the same will be very slightly below the line drawn between the pivot 26 of the link portion 22 and the center of the shaft 21.

By referring to the dotted position of the parts in Fig. 2 it will be seen that when the door 16 is open the toggle is broken upwardly and it will be clear from the above that when the door is in its closed position it is held from opening due to the fact that the pivot point 25 is beyond the line of the pivots of the links 20 and 22.

Figure 4:
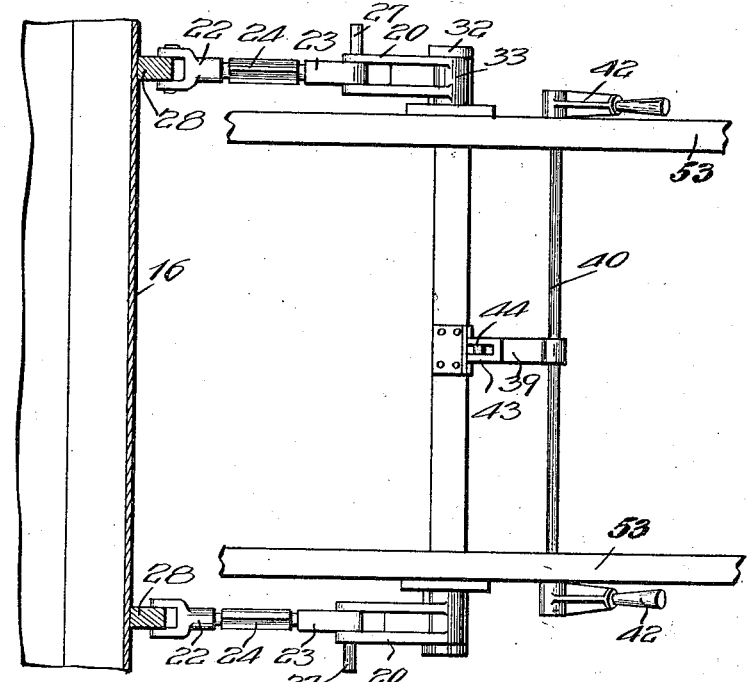
Fig. 4 is a section taken on the line 4—4, Fig. 2, looking in the direction of the arrows.

Referring to Fig. 4 of the drawings it will be seen that a handle 27 is provided extending laterally from link 20 at the pivot point 25. By lifting the pivot connection between the members 20 and 23 above the line extending from the center of the shaft 21 to the pivot 26 by means of the handle 27, the toggle is broken and the doors will be opened due to the weight thereof and due to the weight of the material in the hopper. It will be evident on referring to Figs. 2 and 4 that each hopper is provided with four of the toggle mechanisms described above, one of which is attached at each end of each of the two doors 16 and 17, there being suitable lugs 28 provided on the doors for this purpose. The links 20 of each door are keyed to a common shaft 21 and it will be seen that if this shaft is locked against rotation the toggle mechanism will be locked so as to hold the doors in a desired position, and in the present device a suitable locking means is provided for holding the doors in a closed position as shown in Fig. 1. The shaft 21 is carried in suitable brackets 30 secured to opposite side members 31 of the framework 10. These brackets have a lower U-shaped portion 32 within each of which is located a hub 33 of the link 20 which is suitably keyed to the shaft 21, the shaft 21 extending through the bracket 30. The central portion of each shaft 30 has non-rotatably secured thereto a bracket member 34, which is provided with a socket portion 35, which is adapted to receive a bolt or detent 36, which is adapted to lock the same in the position shown in Figs. 1 and 2 in full lines. The bolt 36 is provided with a suitable guide member 37, which is secured in any desired manner to the I-beam 38, which is a cross member of the frame 10, the bolt 36 having a longitudinal sliding movement in the guide 37. Suitable means are provided for lifting the bolt 36 out of engagement with the socket portion 35, the lifting mechanism comprising a lever 39 keyed to the shaft 40 suitably mounted in blocks 41 mounted on the vehicle framework 10. The transverse shaft 40 has keyed thereto at the opposite ends thereof the hand operating levers 42. The lever 39 is provided with a bifurcated slotted portion at 43 adapted to receive the pin 44 on the upper end of the bolt 36.

It will be seen that when the lever 42 is lowered or turned in a clockwise direction from the position shown at the right of Fig. 2 that the lever or arm 39 will also turn in a clockwise direction and will raise the bolt 36 out of the recess 35 in the bracket member 34 thus unlocking the device and permitting the toggle mechanism to be opened by an upward movement of the handle 27. A spring 45 is provided for retracting the parts to the position shown in full lines in Fig. 2, and in order that the bolt will readily be seated in the recess 35 the bracket member 34 is provided with an inclined surface 46 with which the bolt 36 is adapted to cooperate, the spring 45 pressing the bolt against the inclined surface as the bracket member 34 moves in a counterclockwise direction so that the bolt rides up the inclined surface and snaps into the recess 35 to lock the parts in the position shown in Fig. 2 in full lines, thus locking the doors in their closed position.

It will be seen that by the devices described a bottom dump hopper door operating mechanism is provided that is adapted to hold the doors in their closed position, and is provided with means for readily unlocking the device to permit the doors to open under the weight of the load, and that locking means are provided for the door holding devices that is operable from either side of the vehicle, only one of said devices having to be unlocked to open one of the doors.

It will also be seen that the toggle mechanism can be unlocked from either side of the vehicle due to the fact that the levers 20 are keyed to a common shaft 21.

The lower body portion 14 is provided with an angle member 50 extending entirely around the upper edge thereof, and the upper hopper section 15 is provided with an angle member 51 cooperating with the member 50 and extending entirely around the lower edge portion thereof. The hopper formed by the portions 14 and 15 has vertically extending side portions and straight inclined end portions extending from the upper edge thereof to the point 52 where the doors 16 and 17 come into engagement, thus providing unbroken surfaces over which the material may readily slide to the opening provided by the doors. Suitably secured to the upper hopper section 15 are longitudinally extending channel members 53 which are adapted to reinforce the bottom portions of the upper section 15 of the hopper and serve to secure the same to the framework 10. The channels 53 are secured to the longitudinally extending members 31 of the framework 10 by any suitable means such as the U-shaped brackets 54. The brackets 54 are carried by the channel members 53 and are suitably bolted to the longitudinally extending members 31, whereby a detachable connection is provided between the members 53 and 31 or between the upper hopper section 15 and the lower hopper section 14, the channels 53 resting on the longitudinally extending members 31 so as to provide a secure and rigid construction.

The structure described is shown as being applied to a four-wheeled trailer provided with suitable coupling devices 55 at each end thereof, such a trailer is quite commonly used for road building purposes, and in order to provide suitable spreader means for the hopper described for road building purposes the doors 16 and 17 are provided with suitable eyes 56, four of these eyes being provided one at each of the inner corners of the doors. Through the eyes 56 extends a chain 57 which is provided with an eye or ring 58, and a short chain length 59 provided with a terminal hook 60. The hook 60 is adapted to cooperate with anyone of the links 61 of a short chain length which is secured to the short arm 62 of the lever 63 pivoted to the upper body section 15 at 64 and adapted to cooperate with the hook 65 provided on the bracket 66 mounted on the body section 15.

It will be seen that the hook 65 is formed from a right angularly extending portion 67 of the bracket 66, the base portion of which is suitably riveted to the upper body section 15.

In order to operate the devices last described the lever 63 is moved to the position shown in Fig. 1, the doors being closed and held in the closed position by the holding and locking devices previously described, the chain members will be loose and the hook 60 can be placed in any suitable link of the chain portion 61.

When it is desired to adjust the doors so that they will be held tightly in their closed position by the chains, the hook 60 is placed in a link of the chain 61 so that the chains will be taut when the lever 63 is in engagement with the hook 65. Then if it is desired to dump the entire load in a pile the lever 63 is released from the hook 65 and the unlocking devices are operated and the handles 27 are raised, the chains permitting the doors to open wide and dump the entire load. If it is desired to spread the material that is in the hopper the lever 63 is released from the hook 65 and a hook 60 is placed in any desired chain link toward the free end 68 of the chain from that necessary to hold the doors in a tightly closed position, and the lever 63 is then replaced in engagement with the hook 65 after which the unlocking levers 42 and the handles are operated to open the doors. It will be seen that the doors are now only open as far as the slack left in the chain, by moving the hook 60 toward the free end thereof, will permit and that this opening can be adjusted to any desired extent. The lever 63 can also be used for closing the doors if desired after the load has been dumped, or these can be closed by means of the handles 27 as will be evident.

In Figs. 5 and 6 a modified form of door operating mechanism is shown in which the parts 22, 23 and 24 are the same as before. The door operating mechanism which comprises the parts referred to, is also provided with the handle 27 as previously described. Instead of the lever 20 being provided as in the form shown in Figs. 1 to 4 inclusive, a lever 69 is provided which is keyed to the shaft 21 in a manner similar to that of the lever 20. The shaft 21 is provided with the bracket 34 having the socket 35 with which the bolt 36 cooperates as has been previously described. The means for operating the locking bolt 36 and for breaking the toggle comprising the adjustable link and link 69 is so constructed that it can be operated from a point remote therefrom, such as the driver's seat of the vehicle. In order to raise the bolt 36 a lever 70 is provided, which is adapted to be pulled downwardly as shown in Fig. 6 by means of a flexible member, such as the cable 71, suitably secured to the lever 70 by a hook or other fastening device 72 and passing over a pulley 73 to a point remote from the hopper. The lever 70 is keyed to the shaft 74 suitably mounted on the vehicle framework and is adapted to be retracted to its uppermost position by means of the spring 75 secured to the lever 70 and the hopper. Keyed on the shaft 74 is an arm or lever 76 which is provided with spring operated locking fingers 77 made in the form of a bell crank lever, one arm of which has secured thereto the spring 78, the other end of said spring being secured to the body portion of the arm 76. The other arm of the finger 77 is adapted to cooperate with an opening in the upper end portion 79 of the bolt 36 to raise the same out of the recess 35 when the lever 70 is moved in a clockwise direction or lowered by means of the flexible member 71. The spring 78 provides a resilient engagement between the finger 77 and the opening in the upper end portion 79 of the bolt. The said bolt is adapted to be moved downwardly into engagement with the recess 35 by means of the compression spring 80 mounted between the upper end 79 of the bolt 36 and the body of the hopper in any suitable manner. After the doors are unlocked and opened the lever 70 is retracted to its normal position by means of the spring 75. When the doors are again closed the bolt 36 will slide along the upper inclined surface of the member 34 and will finally engage with the recess 35. Prior to engaging with this recess the bolt 36 is raised above the position shown in Fig. 6 due to engagement with the inclined surface of member 34. However, the member 70 is in the position shown in Fig. 6 at this time. By providing the finger 77 with spring 78 the finger 77 will turn about its pivot sufficiently to permit the bolt 36 to rise upwardly beyond the position shown in Fig. 6, as the spring 78 permits finger 77 to slide past the opening in the bolt 36 and along the shank of said bolt. When recess 35 is again aligned with bolt 36 the bolt drops to the position shown in Fig. 6 and the finger 77 is pulled into engagement with the opening in the bolt by means of spring 78, thus assuming the position shown in Fig. 6. A pin 81 is provided on the lever 70 between the shaft 74 and the point where the securing member 72 engages therewith. A vertically extending link has a longitudinally extending slot 83 adapted to engage with the pin 81 in the upper end thereof. The lower end of the link 82 has pivotally secured thereto the lever 84 which has a right angular end portion 85 adapted to engage with the bottom side of the lever 69.

It will be seen that as the lever 70 is lowered by means of the flexible member 71 that the bolt 36 will first be raised out of engagement with the recess 35 after which the pin 81 will reach the lower end of the slot 83 and will move the link 82 downwardly thus causing an upward movement of the end portion 85 of the lever 84 swinging the same in a clockwise direction and unlocking the toggle and thus permitting the doors to open.

Having thus described my invention what I desire to claim and secure by United States Letters Patent is:

1. In a device of the character described, a vehicle framework, a bottom dumping hopper mounted thereon, a pair of doors mounted on said hopper and normally closing the bottom thereof, transversely extending pivot members on which said doors are swingingly mounted, said doors forming substantially a V-bottom for said hopper when in closed position, and said doors swinging each toward an end of the vehicle upon opening movement, whereby said doors are adapted to swing to a substantially horizontal position to discharge the contents of said hopper without spreading the same when the vehicle is moving either forwardly or rearwardly, means for holding said doors in closed position and locking means for said holding means.

2. In a device of the character described, a vehicle framework, a bottom dumping hopper mounted thereon, a pair of doors mounted on said hopper and normally closing the bottom thereof, transversely extending pivot members on which said doors are swingingly mounted, said doors forming substantially a V-bottom for said hopper when in closed position, and said doors swinging each toward an end of the vehicle upon opening movement, whereby said doors are adapted to swing to a substantially horizontal position to discharge the contents of said hopper without spreading the same when the vehicle is moving either forwardly or rearwardly, means for holding said doors in closed position, locking means for said holding means and adjustable flexible means for automatically checking the opening movement of said doors at any desired point, said last mentioned means also serving as an additional means for holding said doors in closed position.

3. In a device of the character described, a vehicle framework having a flat top and a bottom dumping hopper mounted thereon, said hopper comprising a bottom section having its upper edge flush with the top of said framework, and a detachable top section, said top section resting on said bottom section, and a longitudinally extending member secured thereto adapted to rest on said framework and to be detachably secured thereto.

4. In a device of the character described, a vehicle framework, a bottom dumping hopper mounted thereon, said hopper being provided with a pair of swinging doors mounted on pivots extending transversely of said hopper, pairs of toggle members for holding said doors in closed position, and a single locking member for each pair of toggle members whereby each of said doors may be individually controlled.

5. In a device of the character described, a vehicle framework, a bottom dumping hopper mounted thereon, said hopper being provided with swinging doors mounted on pivots extending transversely of said hopper, pairs of toggle members for holding said doors in closed position, and a single locking member for each pair of toggle members, and means at the pivots of said toggle members whereby said toggle members are operable from either side of the vehicle.

6. In a device of the character described, a vehicle framework, a bottom dumping hopper mounted thereon, doors swingingly mounted on said hopper, pairs of toggle members pivotally connected to said doors and means for mounting said toggle members pivotally relatively to said framework, each pair of said toggle members being keyed to a common shaft mounted in said framework, and means locking said shaft against rotation to lock said doors in closed position, said means comprising a recessed block on said shaft and a finger adapted to enter said recess.

7. In a device of the character described, a vehicle framework, a bottom dumping hopper mounted thereon, doors swingingly mounted on said hopper, pairs of toggle members pivotally connected to said doors, a plurality of shafts, means on said framework in which said shafts are journaled, each pair of said toggle members being keyed to a common shaft, and means locking said shaft against rotation to lock said doors in closed position, said locking means comprising an operating member and handles keyed to a common shaft whereby said locking means is operable from either side of said vehicle.

8. In a device of the character described, a vehicle framework, a bottom dumping hopper mounted thereon, doors swingingly mounted on said hopper, toggle members pivotally connected to said doors and means for mounting said toggle members pivotally relatively to said framework, each of said toggle members being provided with a handle at the toggle joint for unlocking said toggle, and locking means for said toggle members.

9. In a device of the character described, a vehicle framework, a bottom dumping hopper mounted thereon, doors swingingly mounted on said hopper, toggle members pivotally connected to said doors and means for mounting said toggle members pivotally relatively to said framework, each of said toggle members being provided with a handle at the toggle joint for unlocking said toggle, and locking means for said toggle members, said toggle members operating in pairs, whereby the unlocking of one of said toggle members unlocks the other thereof.

10. In a device of the character described, a vehicle framework, a bottom dumping hopper mounted thereon, doors swingingly mounted on said hopper, toggle members pivotally connected to said doors and means for mounting said toggle members pivotally relatively to said framework, locking means for said toggle members, and means for releasing said locking means and breaking said toggle members from a remote point, said means being provided with a lost motion connection.

11. In a device of the character described, a vehicle framework, a bottom dumping hopper mounted thereon, doors swingingly mounted on said hopper, toggle members pivotally connected to said doors and means for mounting said toggle members pivotally relatively to said framework, locking means for said toggle members, and flexible means for releasing said locking means and breaking said toggle members from the driver's seat, said means being provided with a lost motion connection.

12. In a device of the character described, a vehicle framework, a bottom dumping hopper mounted thereon, said hopper being provided with swinging doors mounted on pivots extending transversely of said hopper, and adjustable means for limiting the opening movement of said doors, said limiting means comprising a chain threaded through eyes on said doors and means for adjusting the effective length of said chain, said chain being provided with a tightener lever and means for holding said lever in tightening position, whereby said chain holds said doors in closed position.

In witness whereof, I hereunto subscribe my name this 21st day of August, A. D. 1920.

ALBERT P. LEE.